United States Patent [19]

Willcox

[11] 4,054,763

[45] Oct. 18, 1977

[54] PRESSURE SWITCH AND GAUGE

[75] Inventor: Dale F. Willcox, Aurora, Ill.

[73] Assignee: Furnas Electric Company, Batavia, Ill.

[21] Appl. No.: 679,800

[22] Filed: Apr. 23, 1976

[51] Int. Cl.² .................... G01D 13/26; H01H 35/24
[52] U.S. Cl. ........................... 200/56 R; 200/83 R; 200/83 P
[58] Field of Search .............. 200/56 R, 56 A, 81 R, 200/83 R, 83 B, 83 P, 83 Q, 83 WM, 83 S, 83 SA

[56] References Cited

U.S. PATENT DOCUMENTS

| 1,979,608 | 11/1934 | DuBrie | 200/83 P |
|---|---|---|---|
| 3,236,963 | 2/1966 | Parmann et al. | 200/83 P X |
| 3,303,302 | 2/1967 | Murphy, Jr. et al. | 200/56 R |
| 3,358,098 | 12/1967 | Hill | 200/83 R |
| 3,736,808 | 6/1973 | Reis | 200/56 R X |
| 3,890,477 | 6/1975 | Saunders | 200/83 P |

Primary Examiner—James R. Scott

[57] ABSTRACT

A pressure switch incorporates a pressure gauge in which the indicator actuator is operatively connected to an element movable in response to pressure variations in the system being monitored, which element is also part of the switch operating mechanism.

3 Claims, 7 Drawing Figures

U.S. Patent  Oct. 18, 1977  Sheet 1 of 2  4,054,763
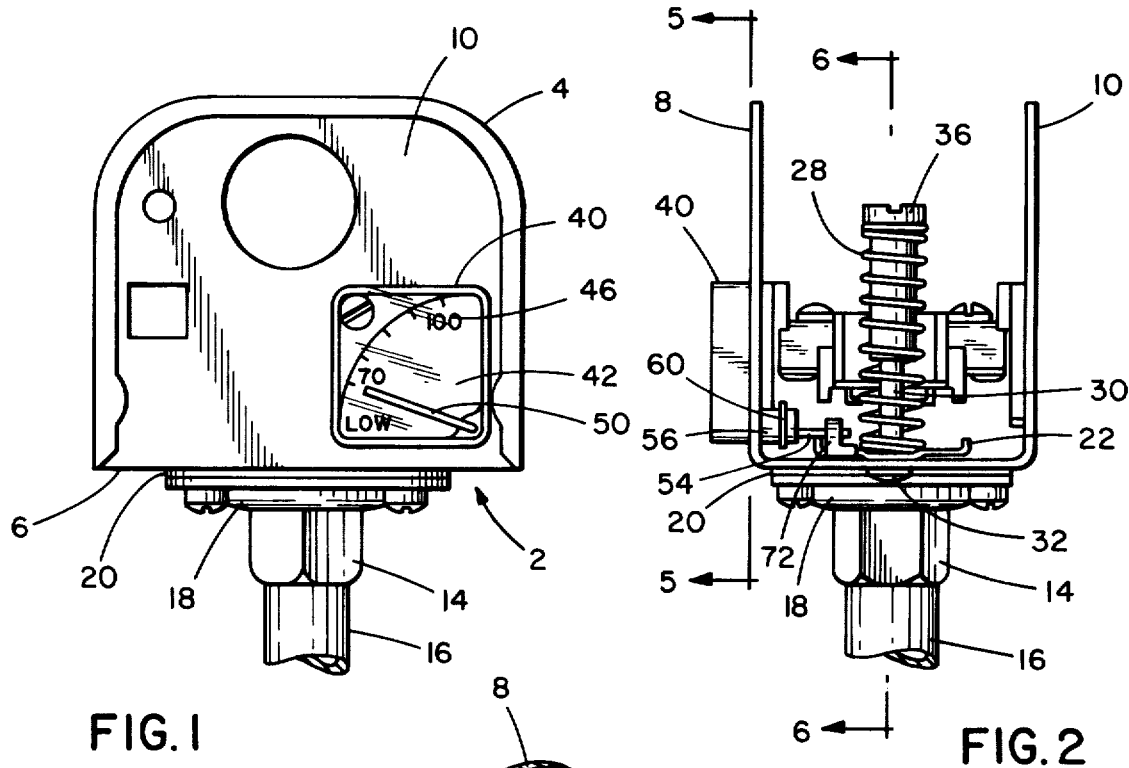
FIG. 1
FIG. 2
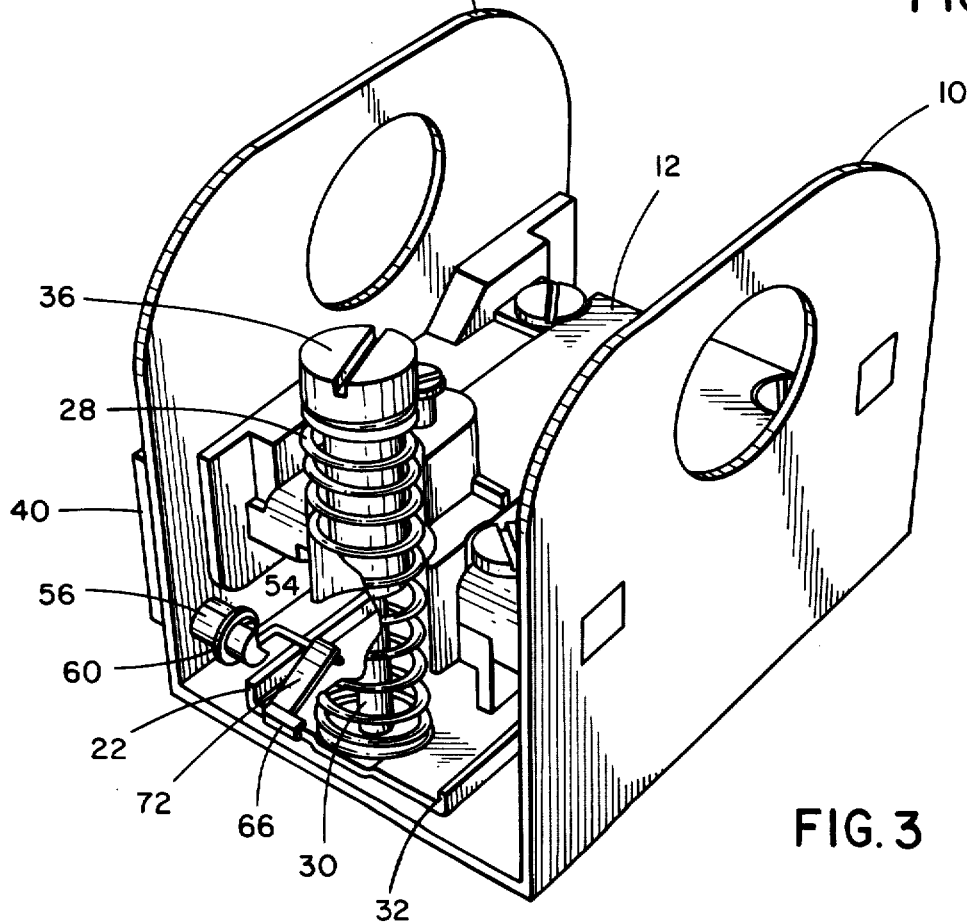
FIG. 3

U.S. Patent  Oct. 18, 1977  Sheet 2 of 2  4,054,763
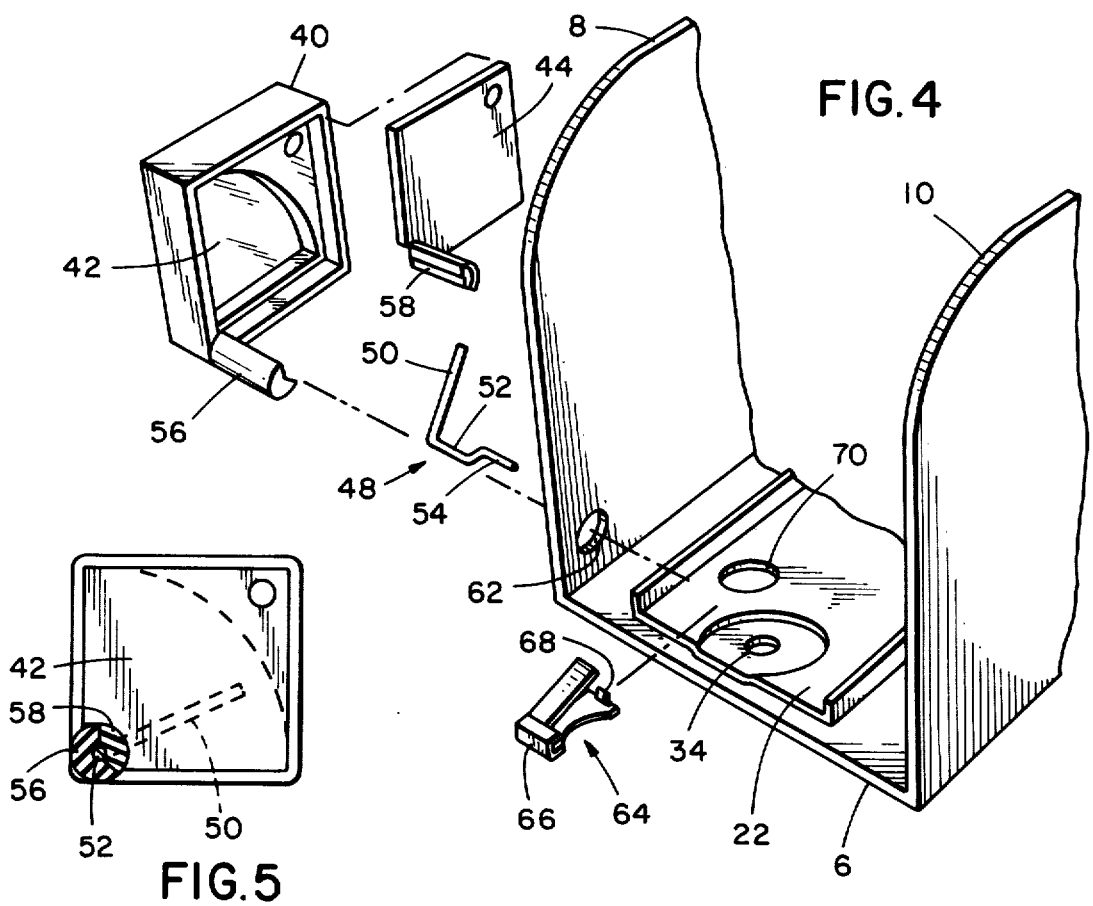
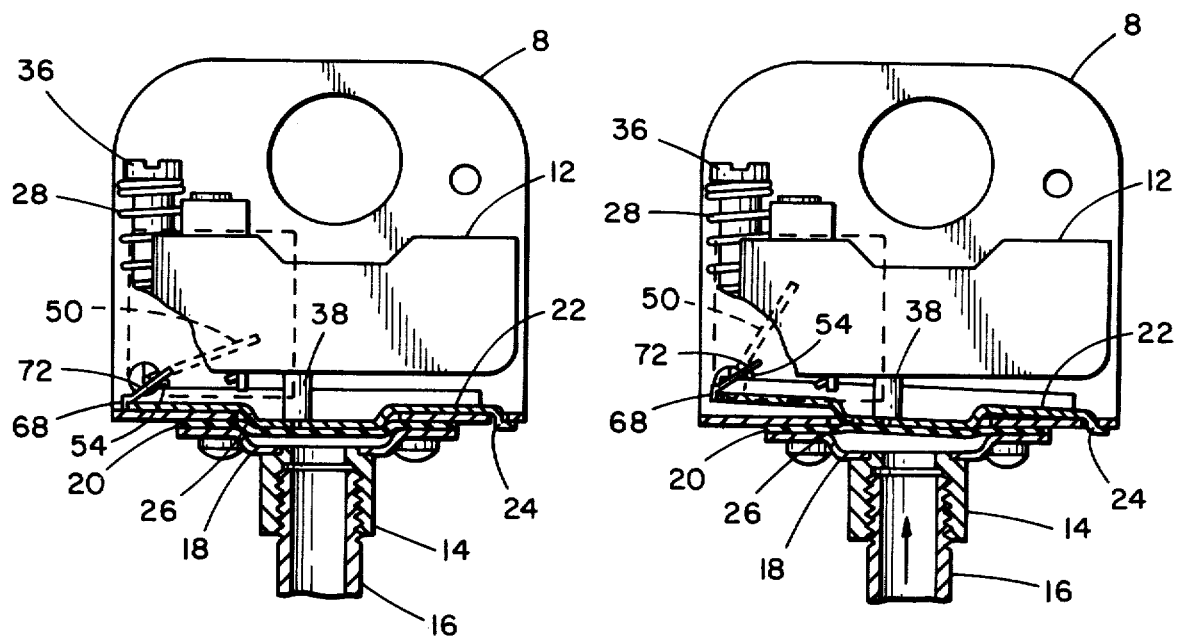

PRESSURE SWITCH AND GAUGE

BACKGROUND OF THE INVENTION

The invention relates generally to improved fluid and gas pressure monitoring apparatus. More speficically, it relates to improvements in apparatus for controlling and measuring the pressure in a system wherein a fluid or gas are under pressure.

It is well known to provide pressure responsive switches adapted to be connected to fluid or gas lines and operable in response to variations in pressure to control motors, pumps or the like so as to control pressure in the line. One such switch is that shown in the patent to Parmann et al U.S. Pat. No. 3,236,963 issued on Feb. 22, 1966. It is equally well known to provide in a fluid or gas system a gauge for indicating the pressure in the system. When such elements are provided as separate entities the cost of providing both functions, control and indication, is relatively high.

Therefore it is an object of this invention to provide a novel apparatus which includes in a single entity a pressure responsive switch and a pressure gauge.

It is another object of this invention to provide a novel pressure responsive switch and a pressure gauge in which common operating elements are effective to provide a control and an indication.

It is a further object of this invention to provide a unitary device for both controlling and indicating fluid or gas pressure which is reliable and relatively accurate while at the same time is economical to manufacture.

BRIEF SUMMARY OF THE INVENTION

The foregoing and other objects are achieved by providing a pressure gauge mounted on the housing of a pressure switch and by mechanically connecting the pressure indicating element of the gauge to the pressure responsive mechanism actuating the switch.

BRIEF DESCRIPTION OF THE DRAWINGS

The invention itself is set forth in the claims appended hereto and forming a part of this application, while an understanding of the construction and operation of an embodiment therefor may be had by reference to the detailed description taken in conjunction with the following drawings in which:

FIG. 1 is a side view of an assembled embodiment of the invention;

FIG. 2 is an end view of the embodiment of FIG. 1 with the cover removed;

FIG. 3 is a perspective illustration of the embodiment of FIG. 1;

FIG. 4 is an exploded illustration of the embodiment of FIG. 1;

FIG. 5 is a view along the line 5—5 of FIG. 2;

FIG. 6 is a view along the line 6—6 of FIG. 2 showing the position of various elements when the pressure sensed is relatively low; and FIG. 7 is a view similar to FIG. 6 showing the position of various elements when the pressure sensed is relatively high.

DETAILED DESCRIPTION

As shown in FIG. 1, one embodiment of the invention comprises a supporting frame 2 and housing cover 4. The frame 2 includes a bottom wall 6 and upstanding side walls 8 and 10. Mounted in the supporting frame 2 is a contact block 12 in which the switch mechanism is carried whereby circuits may be made or broken between terminals when the mechanism is actuated.

The particular switching mechanism is not a part of this invention, and is not shown or described in detail herein. One such mechanism is that described in detail in U.S. Pat. No. 3,236,963 referred to above. However, by way of exemplification, the pressure switch shown in that patent as with most of such switches has a coupling element 14 which is internally threaded to be attached to a source 16 of fluid or gas pressure to be monitored and controlled. The element 14 is secured to a diaphragm enclosure 18 which in turn secures a resilient diaphragm 20 to the bottom wall 6.

A pressure lever 22 is pivoted at 24 in the bottom wall and has a depressed portion 26 which lies directly over and has contact with the diaphragm 20. The free end of the lever 22 is held by a spring 28 which encircles a screw 30, the head 32 of which is below the bottom wall 6 so that its body extends upward through the bottom wall and a hole 34 in the pressure lever 22. A compression adjusting element 36 is threaded onto the screw 30 so that the spring 28 is confined and bears on the free end of the lever 22 with a force which may be adjusted.

When the pressure in the system under control is increased the diaphragm 20 is forced upward as shown in FIG. 7 causing the lever 22 to rotate about its pivot 24. The upward movement of the lever is transmitted to the switch operating mechanism through a pin or push rod 38 and causes the switch to operate to open or close the circuit.

As may be seen, therefore, the movements of the pressure lever 22 and push rod 38 are directly related to variations in the pressure of the system under control. In accordance with the invention means are provided for coupling a selected related mechanical movement to a pressure gauge in order to derive an indication of the pressure.

In the illustrated embodiment this is achieved by providing a pressure gauge constituted by a gauge housing 40 having a transparent face 42. Fitted into the housing is a plate 44 on which suitable indicia 46 may appear so as to be visible through the face 42. An indicator 48 has a pointer portion 50 bent out from a shaft portion 52 to which is connected a crank portion 54.

When assembled the pointer portion 50 lies across the plate 44 and the shaft portion is rotatable within a bearing formed by lug 56 extending from the gauge housing 40 and a complementary lug 58 extending from the plate. The crank portion 54 extends from the bearing formed by the lugs 56 and 58 and held together by a snap ring 60. When the gauge is mounted on the housing 2 the bearing extends through an opening 62 in the side wall 8 with the crank portion 54 extending toward the pressure lever 22.

Attached to the pressure lever 22 is a spring clip 64 which is attached to the free end of the lever and has generally a U-shaped portion 66 and detent 68engaging through an opening 70 in the lever. Spring arm 72 extends upwardly from the clip and traps the crank portion 54 of the indicator 48 between its bottom surface and the top of the pressure lever 22.

In operation, as pressure in the system increases on the bottom surface of the diaphragm 20 the pressure lever 22 rotated clockwise about its pivot 24, as shown in FIG. 7. The movement of the free end of the pressure lever causes the crank portion 54 of the indicator to rotate counter-clockwise, as shown in FIG. 7, and moves the pointer portion 50 across the face of the gauge.

Thus, the movement of the switch operating mechanism in response to variations in system pressure is coupled mechanically to the indicator of the pressure gauge and provides a visible indication of that pressure. It is possible, while still remaining within the scope of the invention, to couple the indicator to some other element in the switch operating mechanism, the movement of which is related to variations in pressure.

Obviously other changes can be made in design while still remaining within the scope of the invention as set forth in the claims.

What is claimed as new and desired to be secured by Letters Patent is:

1. A pressure switch and indicator comprising: a supporting frame having a bottom and side walls upstanding therefrom on opposite sides thereof; said bottom wall having an opening therein; a resilient diaphragm secured to said bottom wall over said opening; a pressure lever pivoted at one end on said bottom wall and in contact with said diaphragm at a point intermediate its length; adjustable biasing means mounted in said housing and engaging the free end of said pivoted pressure lever to urge it toward said bottom wall, a switch mechansim mounted in said frame; a push rod in contact with said pivoted pressure lever and movable therewith in response to upward movement of said diaphragm to operate said switch mechanism; a gauge mounted on the outside of a side wall of said frame and including indicia thereon; an indicator having a pointer extending toward said indicia; a shaft portion extending through said side wall, and a crank portion overlying the free end of said pivoted pressure lever and a clip attached to said free end and trapping said crank portion to cause said crank portion to rotate said shaft portion and said pointer portion to move past said indicia as said diaphragm flexes in response to variations in pressure thereon.

2. The pressure switch and indicator of claim 1 wherein said clip comprises a U-shaped portion, a spring arm on one leg of said "U" and a detent on the other leg thereof, and wherein said pivoted pressure lever has an opening therein and said detent engages in said pressure lever opening, and wherein said crank portion is trapped under said spring arm.

3. The pressure switch and indicator of claim 2 wherein said gauge includes a housing having a bearing portion extending through said side wall and a plate having a complementary bearing portion extending through said side wall to form a bearing in which said shaft portion is rotatable.

* * * * *